(12) United States Patent
LaFerte et al.

(10) Patent No.: US 8,691,909 B2
(45) Date of Patent: Apr. 8, 2014

(54) HEAT CURABLE ADHESIVE COMPOSITION

(75) Inventors: Olivier LaFerte, Trosly Breuil (FR); David Goubard, Compiegne (FR)

(73) Assignee: Bostik S.A., Courbevoie (FR)

( * ) Notice: Subject to any disclaimer, the term of this patent is extended or adjusted under 35 U.S.C. 154(b) by 336 days.

(21) Appl. No.: 12/973,044

(22) Filed: Dec. 20, 2010

(65) Prior Publication Data

US 2011/0151253 A1 Jun. 23, 2011

(30) Foreign Application Priority Data

Dec. 21, 2009 (FR) ...................................... 09 06194

(51) Int. Cl.
*C08L 83/00* (2006.01)
*C08L 57/02* (2006.01)

(52) U.S. Cl.
USPC ......................................................... 524/499

(58) Field of Classification Search
USPC .......................................... 524/502, 499, 521
See application file for complete search history.

(56) References Cited

U.S. PATENT DOCUMENTS

| 8,362,123 B2 * | 1/2013 | Kohl et al. ..................... 524/266 |
| 2004/0180155 A1 | 9/2004 | Nguyen-Misra et al. |
| 2005/0171318 A1 * | 8/2005 | Okuhira et al. .................. 528/34 |

FOREIGN PATENT DOCUMENTS

| EP | 0931800 A1 | 7/1999 |
| WO | 9830648 A1 | 7/1998 |
| WO | 2009106699 A2 | 9/2009 |

OTHER PUBLICATIONS

Institut National De La Propriete Industrielle. "Search Report." FR0906194, Applicant: Bostik SA, Mailed: Mar. 22, 2010.

* cited by examiner

*Primary Examiner* — Robert D. Harlan
(74) *Attorney, Agent, or Firm* — Millen, White, Zelano & Branigan, P.C.

(57) ABSTRACT

1) Heat-curable adhesive composition comprising:
  from 20 to 85% of a polyether (A) comprising 2 hydrolysable alkoxysilane-type end groups, having a viscosity, measured at 23° C., ranging from 25 to 40 Pa·s and of formula (I):

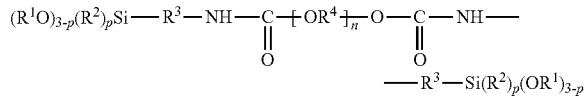

in which:
  $R^1$ and $R^2$ represent an alkyl radical having 1 to 4 carbon atoms;
  $R^3$ represents a linear alkylene radical having 1 to 6 carbon atoms;
  $R^4$ represents an alkylene radical having 1 to 4 carbon atoms;
  n is an integer such that the number-average molecular weight $M_n$ of the polymer of formula (I) is between 20 kDa and 40 kDa;
  p is an integer equal to 0, 1 or 2;
  from 15 to 80% of a compatible tackifying resin (B); and
  from 0.01 to 3% of a curing catalyst (C).

2) Self-adhesive support coated with the cured adhesive composition.

3) Use for the manufacture of self-adhesive labels and/or tapes.

12 Claims, No Drawings

HEAT CURABLE ADHESIVE COMPOSITION

One subject of the present invention is a heat-curable adhesive composition, and a self-adhesive support coated with a pressure-sensitive adhesive consisting of said cured composition. Said self-adhesive support is used for manufacturing self-adhesive labels and/or tapes and advantageously has an adhesive strength which may be maintained over a wide temperature range.

Pressure-sensitive adhesives or PSAs are substances that give the support layer that is coated therewith an immediate tack at room temperature, which allows its instantaneous adhesion to a substrate under the effect of brief slight pressure. PSAs are widely used for the manufacture of self-adhesive labels which are fastened to articles for the purpose of presenting information (such as a bar code, description, price) and/or for decorative purposes. PSAs are also used for the manufacture of self-adhesive tapes of various uses. Mention may be made, for example, besides the transparent adhesive tape widely used in daily life, of the forming and assembling of cardboard packaging; the protection of surfaces for painting works, in construction; holding electrical cables in the transport industry; the bonding of carpets by double-sided adhesive tapes.

With a view to the manufacture of self-adhesive labels and/or tapes, PSAs are usually applied by continuous coating processes to the entire surface of a (where appropriate printable) support layer of large dimensions, in an amount (generally expressed in $g/m^2$) and denoted hereinbelow by the term "weight per unit area". The support layer is constituted of paper or of film of polymer material having one or more layers. The adhesive layer that covers the support layer may itself be covered with a protective non-stick layer (often called a "release liner"), for example composed of a siliconized film. The multilayer system obtained is generally packaged by being wound up in the form of large reels up to 2 m in width and 1 m in diameter, which can be stored and transported.

These multilayer systems may subsequently be converted to self-adhesive labels that can be applied by the end users by means of conversion processes that include the printing of desired decorative elements and/or information on the printable side of the support layer, followed by cutting to the desired shape and dimensions. The protective non-stick layer may be easily removed without modifying the adhesive layer that remains fastened to the support layer. After separation from its protective non-stick layer, the label is applied to the article to be coated either manually, or with the use of labellers on automated packaging lines.

These multilayer systems may also be converted to self-adhesive tapes by cutting and packaging as rolls of predetermined width and length.

PSAs, because of their high tack at room temperature, make it possible for the self-adhesive label and/or tape to be rapidly bonded to the substrate (or article) to be coated (for example, regarding labels, onto bottles or else, regarding tapes, onto packing boxes to be formed), suitable for obtaining high industrial production rates.

There is a field of application of PSAs for which it is desirable for the adhesive strength of the labels and/or tapes on the substrate to also be maintained when the adhesive joint that provides the fastening is exposed (and also, therefore, the article coated with the label and/or tape) to a temperature capable of varying over a wide range. Mention may be made, by way of example, of the laying of labels on certain components of motor vehicles (or other vehicles) located in the vicinity of the engine, or on packaging designed to receive a hot liquid during the packaging thereof, or else on articles (such as tyres) which are labelled when hot, at the end of production lines. Mention may also be made of the use of self-adhesive tapes for the assembly of parts for which a good thermal resistance is necessary such as in the case, for example, of the interior trim of aircraft or other vehicles.

PSAs often used for this field of application include acrylate-type polymers (or copolymers) of very high molecular weight. The latter are in the form either of an aqueous emulsion or of an organic solution. However, the coating of such PSAs on a support layer is complicated, from an industrial point of view, by the fact that it is necessary to provide either a supplementary step of drying the emulsion, or particular installations that take into account the industrial safety and health problems linked to the evaporation of the organic solvent. In both cases, the drawbacks linked to the unpleasant odour of the acrylics must also be taken into account.

PSAs are known that do not comprise either solvent or water. Thus, hot-melt pressure-sensitive adhesives or HMPSAs are substances that are solid at room temperature, which are deposited (or coated) on the support in the melt state, and give the latter, after cooling, high tack and high adhesive strength on various substrates. However, the corresponding compositions generally comprise a thermoplastic polymer, so that the adhesive joint providing the attachment of the support to the substrate does not have, at high temperature, all the cohesion needed for the field of application targeted previously.

Also known, from international application WO 09/106,699, is a heat-curable adhesive composition based on a polyurethane comprising 2 hydrolysable alkoxysilane-type end groups. This composition results, after coating on a support then curing, in a pressure-sensitive adhesive that has advantageous adhesive strength and tack properties. Furthermore, the adhesive joint providing the attachment of the self-adhesive support thus obtained to a substrate retains the required cohesion over a wide temperature range.

The curing time needed to obtain these advantageous adhesion properties is a particularly important parameter from the point of view of the industrial production of self-adhesive supports. This is because it determines the sizing of the oven needed for the heating, and also the corresponding residence time of the coated support layer, or else the energy consumption, and therefore the productivity of the process as a whole.

The objective of the present invention is to reduce this curing time, while retaining the advantageous adhesion properties of the pressure-sensitive adhesive described by application WO 09/106,699.

Another objective of the present invention is to propose a pressure-sensitive adhesive that has advantageous adhesive strength and tack properties.

Another objective of the present invention is to propose a self-adhesive support such that the adhesive joint resulting from its attachment to a substrate retains the required cohesion over a wide temperature range.

It has now been found that these objectives can be achieved, completely or partly, by means of the adhesive composition and of the self-adhesive support which are described below.

A first subject of the present invention is therefore a heat-curable adhesive composition comprising:
  from 20 to 85% of one (or more) polyether(s) (A) comprising 2 hydrolysable alkoxysilane-type end groups, having a viscosity, measured at 23° C., ranging from 25 to 40 Pa·s and of formula (I):

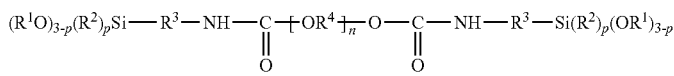

in which
- $R^1$ and $R^2$, which are identical or different, each represent a linear or branched alkyl radical having 1 to 4 carbon atoms, with the possibility, when there are several $R^1$ (or $R^2$) radicals, that these are identical or different;
- $R^3$ represents a linear alkylene divalent radical comprising from 1 to 6 carbon atoms;
- $R^4$ represents a linear or branched alkylene divalent radical comprising from 1 to 4 carbon atoms;
- n is an integer such that the number-average molecular weight $M_n$ of the polymer of formula (I) is between 20 kDa and 40 kDa;
- p is an integer equal to 0, 1 or 2;
- from 15 to 80% of one (or more) compatible tackifying resin(s) (B), having a number-average molecular weight between 200 Da and 10 kDa; and
- from 0.01 to 3% of a curing catalyst (C).

In the present text and in the absence of contrary indication:
- the amounts expressed in the form of a percentage correspond to weight/weight percentages;
- the $R^1$ to $R^4$ radicals and also the integers n and p retain the same meaning as that defined above in the various chemical formulae;
- the number-average and weight-average molecular weights are expressed in daltons (Da) and are determined by gel permeation chromatography, the column being calibrated with polystyrene standards;
- the viscosities at 23° C. indicated are measured using a Brookfield viscometer, with a No. 7 spindle rotating at a rate adapted to the sensitivity of the sensor (on average at 20 rpm).

The polymer (A) of formula (I) included in the composition according to the invention may be obtained by reacting a polyether diol of formula (II):

with an isocyanatosilane of formula (III):

in a ratio of around one mole of polyether diol of formula (II) per two moles of the compound of formula (III).

The polyether dials of formula (II) are widely available commercially, as are the isocyanatosilanes of formula (III) too. By way of example of the latter, mention may be made of γ-isocyanato-n-propyltrimethoxysilane which is available under the name GENIOSIL® GF 40 or else α-isocyanato-n-methyl(methyl)dimethoxysilane which is available under the trade name GENIOSIL® XL 42, both from Wacker.

This synthesis step is carried out under anhydrous conditions, so as to avoid hydrolysis of the alkoxysilane groups. A typical temperature range for carrying out this reaction is from 30 to 120° C., and more particularly from 60 to 90° C. A slight variation with respect to the stoichiometries given previously may be envisaged without any drawback, provided, however, that it does not exceed 2%.

Polyethers (A) of formula (I) are also commercially available.

According to one preferred variant of the adhesive composition according to the invention, the polyether(s) (A) of formula (I) has one and/or the other of the following features:

- $R^1$ and $R^2$, which are identical or different, each represent a methyl or ethyl radical;
- $R^3$ represents a linear alkylene divalent radical comprising from 1 to 3 carbon atoms;
- $R^4$ is chosen from the divalent radicals: ethylene, isopropylene, n-propylene, n-butylene, ethyl-ethylene.

According to a still more preferred variant of the adhesive composition according to the invention, the polyether(s) (A) of formula (I) is such that:
- p=0 or 1;
- $R^1$ and $R^2$ each represent the methyl radical; and
- $R^4$ is an alkylene radical having 3 carbon atoms.

According to another preferred variant of the composition according to the invention, the polyether (A) of formula (I) is such that its number-average molecular weight varies from 30 to 40 kDa and its viscosity from 30 to 37 Pa·s.

According to one equally advantageous variant of the composition according to the invention, the polyether (A) of formula (I) has a polydispersity index ranging from 1 to 2. The polydispersity index is the ratio of the weight-average molecular weight to the number average molecular weight. In this case, the polyether (A) of formula (I) may be prepared from a polyether diol of formula (II) itself having a polydispersity index ranging from 1 to 2. The latter polyether diol may be obtained, in a known manner, by polymerization of the corresponding alkylene oxide in the presence of a catalyst based on a double metal-cyanide complex.

As regards the tackifying resin(s) (B) which are included in the composition according to the invention, the expression "compatible tackifying resin" is understood to mean a tackifying resin which, when it is mixed in 50%/50% proportions with the polymer (A) of formula (I), gives a substantially homogeneous blend.

The resins (B) are advantageously chosen from:
(i) resins obtained by polymerization of terpene hydrocarbons and phenols, in the presence of Friedel-Crafts catalysts;
(ii) resins obtained by a process comprising the polymerization of α-methyl-styrene, said process possibly also including a reaction with phenols;
(iii) natural or modified rosins, such as for example the rosin extracted from pine gum, wood rosin extracted from tree roots and their derivatives that are hydrogenated, dimerized, polymerized or esterified by monoalcohols or polyols such as glycerol;
(iv) resins obtained by hydrogenation, polymerization or copolymerization (with an aromatic hydrocarbon) of mixtures of unsaturated aliphatic hydrocarbons having around 5, 9 or 10 carbon atoms derived from petroleum fractions;
(v) terpene resins, generally resulting from the polymerization of terpene hydrocarbons such as, for example, monoterpene (or pinene) in the presence of Friedel-Crafts catalysts;
(vi) copolymers based on natural terpenes, for example styrene/terpene, α-methylstyrene/terpene and vinyltoluene/terpene; or else
(vii) acrylic resins having a viscosity at 100° C. of less than 100 Pa·s.

Such resins are commercially available and among those of type (i), (ii) and (iii) defined above, mention may be made of the following products:

resins of type (i): DERTOPHENE® 1510 available from DRT that has a molecular weight $M_n$ of around 870 Da; DERTOPHENE® H150 available from the same company with a molecular weight $M_n$ equal to around 630 Da; SYLVAREZ® TP 95 available from Arizona Chemical having a molecular weight $M_n$ of around 1200 Da;

resins of type (ii): NORSOLENE® W100 available from Cray Valley, which is obtained by polymerization of α-methylstyrene without the action of phenols, with a number-average molecular weight of 900 Da; SYLVAREZ® 510 which is also available from Arizona Chemical with a molecular weight $M_n$ of around 1740 Da, the production process of which also comprises the addition of phenols;

resins of type (iii): SYLVALITE® RE 100 which is a pentaerythritol rosin ester available from Arizona Chemical and having a molecular weight $M_n$ of around 1700 Da.

According to one preferred variant, use is made, as resin (B), of a resin chosen from those of type (i) or (ii).

According to another preferred variant, use is made, as resin (B), of a resin of type (iii) and preferably a rosin ester.

The curing catalyst (C) that can be used in the composition according to the invention may be any catalyst known to a person skilled in the art for silanol condensation. Mention may be made, as examples of such catalysts, of organic derivatives of titanium such as titanium acetyl acetonate (commercially available under the name TYZOR® AA75 from DuPont), of aluminium such as aluminium chelate (commercially available under the name K-KAT® 5218 from King Industries), of amines such as 1,8-diazobicyclo[5.4.0] undec-7-ene or DBU.

According to one preferred variant, the heat-curable adhesive composition comprises from 40 to 65% of the polyether (A) of formula (I) and from 35 to 60% of tackifying resin(s) (B).

Optionally, the composition according to the invention may also include, in combination with the polyether (A) of formula (I), thermoplastic polymers often used in the preparation of HMPSAs, such as ethylene vinyl acetate (EVA) or styrene block copolymers.

The heat-curable adhesive composition according to the invention may also comprise up to 3% of a hydrolysable alkoxysilane derivative, as a desiccant, and preferably a trimethoxysilane derivative. Such an agent advantageously prolongs the shelf life of the composition according to the invention during storage and transport, before the use thereof. Mention may be made, for example, of γ-methacryloxypropyltrimethoxysilane available under the trade name SILQUEST® A-174 from US Momentive Performance Materials Inc.

The composition according to the invention may also include a plasticizer such as a phthalate or a benzoate, a paraffinic and naphthenic oil (such as PRIMOL® 352 from Esso) or else a wax of a polyethylene homopolymer (such as A-C® 617 from Honeywell) or a wax of a polyethylene/vinyl acetate copolymer, or else pigments, dyes or fillers.

Finally, an amount of 0.1 to 2% of one or more stabilizers (or antioxidants) is preferably included in the composition according to the invention. These compounds are introduced to protect the composition from degradation resulting from a reaction with oxygen which is capable of being formed by action of heat or light. These compounds may include primary antioxidants which trap free radicals and are, in particular, substituted phenols such as IRGANOX® 1076 from Ciba.

The primary antioxidants may be used alone or in combination with other secondary antioxidants or UV stabilizers.

The heat-curable adhesive composition according to the invention may be prepared by a process which comprises:
 a step of mixing in an air-free environment, preferably under an inert atmosphere, the polymer (A) of formula (I) with the tackifying resin(s) (B), at a temperature between 50 and 170° C., preferably between 100 and 170° C.; then
 a step of cooling said mixture to a temperature ranging from 50 to 90° C., and advantageously of around 70° C.; then
 a step of incorporating catalyst (C) and, where appropriate, desiccant and other optional components into said mixture.

Another subject of the present invention is a self-adhesive support capable of being obtained by the process comprising:
 (a) preheating the adhesive composition as defined previously to a temperature between 50 and 130° C.; then
 (b) coating it onto a support layer; then
 (c) curing it, by heating the thus coated support at a temperature between 50 and 150° C.

The step (b) of coating the support layer is carried out using known coating devices, such as for example a lipped die or a curtain-coating type die, or else a roll. It employs a weight per unit area of adhesive composition ranging from 3 to 500 g/m², preferably from 10 to 250 g/m². The material that can be used for the support layer is, for example, paper or a film of polymer material having one or more layers.

The time needed for the curing of step (c) may vary to a large extent, for example between 1 second and 10 minutes, depending on the weight per unit area of adhesive composition deposited on the support layer, on the heating temperature and on the relative humidity.

This heat-curing step has the effect of creating—between the polymer chains of the polyether of formula (I) and under the action of atmospheric moisture—siloxane-type bonds which result in the formation of a three-dimensional polymer network. The thus cured adhesive composition is a pressure-sensitive adhesive which gives the support layer that is coated therewith desirable adhesive strength and tack.

Thus, a 50 μm thick polyethylene terephthalate (PET) support coated with a weight per unit area of 50 g/m² has permanent adhesion to a stainless steel substrate corresponding to an adhesive strength (measured by the 180° peel test on stainless steel described below) that is advantageously between 1 and 40 N/cm. The tack of this same support at room temperature (measured by the loop tack test described below) is advantageously between 1 and 20 N/cm².

Finally, the adhesive joint formed after application onto a substrate of the support layer coated with the cured composition ensures the attachment of said support layer in a temperature range that extends from −60° C. to +200° C.

The self-adhesive support according to the invention may also comprise a protective non-stick layer that covers the PSA layer and is applied (or laminated) thereto by simple pressure.

The present invention also relates to the use of the self-adhesive support defined previously for the manufacture of single-sided or double-sided self-adhesive labels and/or tapes.

The weight per unit area of heat-curable adhesive composition necessary for the manufacture of self-adhesive labels may range from 10 to 100 g/m², preferably from 20 to 50 g/m². That needed for the manufacture of self-adhesive tapes may vary over a much wider range extending from 3 to 500 g/m², preferably from 15 to 250 g/m² per side.

The following examples are given purely by way of illustration of the invention and should not be interpreted as limiting the scope thereof.

EXAMPLE 1

Heat-curable Adhesive Composition Based on GENIOSIL® STP-E30 Alkoxysilane-terminated Polyether 1) Preparation of the Composition:

The composition that appears in the table below is prepared by firstly introducing the tackifying resin DERTOPHENE® H150 into a glass reactor under vacuum and heated to around 160° C. Then, once the resin is thoroughly molten, the GENIOSIL® STP-E30 is added.

GENIOSIL® STP-E30, available from Wacker, is a polyether of formula (I) in which p equals 1, $R^1$ and $R^2$ represent the methyl radical, $R^3$ is the methylene radical, $R^4$ is an alkylene radical having 3 carbon atoms. This polyether has a viscosity (measured at 23° C.) of 30 Pa·s, an $M_n$ of 38 kDa and a polydispersity index of 1.9.

The mixture is stirred under vacuum for 15 minutes, then cooled to 70° C. The catalyst (K-KAT® 5218) is then introduced. The mixture is kept under vacuum and continues to be stirred for another 10 minutes.

The viscosity of the mixture is then determined at 100° C., using a Brookfield viscometer (equipped with the Thermosel system intended for high-temperature viscosity measurements) provided with an A29 spindle rotating at a rate adapted to the sensitivity of the sensor (on average at 10 rpm).

The result, expressed in Pa·s, is indicated in the table.

2) Preparation of a PET Support Layer Coated with the Cured Composition, with a Weight Per Unit Area Equal to 50 g/m²:

As the support layer, use is made of a rectangular sheet of polyethylene terephthalate (PET) having a thickness of 50 µm and dimensions of 20 cm by 40 cm.

The composition obtained in 1) is preheated to a temperature close to 100° C. and introduced into a cartridge from which a bead is extruded which is deposited close to the edge of the sheet parallel to its width.

The composition contained in this bead is then spread over the entire surface of the sheet, so as to obtain a uniform layer of substantially constant thickness. In order to do this a film spreader (also known as a film applicator) is used, which is moved from the edge of the sheet to the opposite edge. A layer of composition is thus deposited that corresponds to a weight per unit area of 50 g/m², which approximately represents a thickness of the order of 50 µm.

The thus coated PET sheet is then placed in an oven at 120° C. for 30 seconds for the curing of the composition, then laminated to a protective non-stick layer consisting of a sheet of siliconized film that is rectangular and has the same dimensions.

The PET support layer thus obtained is subjected to the tests described below.

180° Peel Test on a Stainless Steel Plate:

The adhesive strength is evaluated by the 180° C. peel test on a stainless steel plate as described in FINAT method No. 1 published in the FINAT Technical Manual, 6$^{th}$ edition, 2001. FINAT is the international federation for self-adhesive label manufacturers and converters. The principle of this test is the following.

A test specimen in the form of a rectangular strip (25 mm×175 mm) is cut from the PET support layer coated with the cured composition obtained previously. This test specimen is, after the preparation thereof, stored for 24 hours at a temperature of 23° C. and in a 50% humidity atmosphere. It is then fastened over ⅔ of its length (after removal of the corresponding portion of protective non-stick layer) to a substrate constituted of a stainless steel plate. The assembly obtained is left for 20 minutes at room temperature. It is then placed in a tensile testing machine capable, starting from the end of the rectangular strip that is left free, of peeling or debonding the strip at an angle of 180° and with a separation rate of 300 min per minute. The machine measures the force required to debond the strip under these conditions.

The corresponding results are expressed in N/cm and are indicated in the table.

Tack Test (Also Known as Loop Test):

The tack is evaluated by the loop tack test described in FINAT method No. 9, the principle of which is the following.

A test specimen in the form of a rectangular strip (25 mm×175 mm) is cut from the PET support layer coated with the cured composition obtained previously. This test specimen is, after the preparation thereof, stored for 24 hours at a temperature of 23° C. and in a 50% humidity atmosphere. After removing all of the protective non-stick layer, the 2 ends of this strip are joined so as to form a loop, the adhesive layer of which is facing outward. The 2 joined ends are placed in the movable jaw of a tensile testing machine capable of imposing a rate of displacement of 300 mm/minute along a vertical axis with the possibility of moving back and forth. The lower part of the loop placed in the vertical position is firstly put into contact with a horizontal glass plate measuring 25 mm by 30 mm over a square area measuring around 25 mm per side. Once this contact has occurred, the displacement direction of the jaw is reversed. The tack is the maximum value of the force needed for the loop to be completely debonded from the plate.

The corresponding results are expressed in N/cm² and are indicated in the table.

Resistance Time of the Adhesive Joint to Static Shear at 95° C.:

The high-temperature stability of the adhesive strength of the PET support layer coated with the cured composition is evaluated, no later than 5 hours after it is obtained, by a test which determines the resistance time of the adhesive joint to static shear at 95° C. Reference is made, for this test, to the FINAT method No. 8. The principle is the following.

A test specimen in the form of a rectangular strip (25 mm×75 mm) is cut from the PET support layer coated with the cured composition prepared previously, at most 5 hours after the preparation thereof. After removal of all of the protective non-stick layer, a square portion of 25 mm per side located at the end of the adhesive strip is fastened to a glass plate.

The test plate thus obtained is introduced, by means of a suitable support, in a substantially vertical position into an oven at 95° C., the non-bonded part of the strip having a length of 50 mm being located underneath the plate. After reaching thermal equilibrium, the part of the strip left free is connected to a weight of 1 kg, the whole of the device always remaining, throughout the duration of the test, kept in the oven at 95° C.

Under the effect of this weight, the adhesive joint which ensures the fastening of the strip to the plate is subjected to a shear stress. To better control this stress, the test plate is in fact placed so as to make an angle of 2° relative to the vertical.

The time taken for the strip to debond from the plate following the rupture of the adhesive joint under the effect of this stress is noted.

This time is indicated in the table.

EXAMPLES 2 AND 3

Heat-curable Adhesive Composition Based (Respectively) on GENIOSIL® STP-E35 and DESMOSEAL® S XP 2636 Alkoxysilane-Terminated Polyethers GENIOSIL® STP-E35 is a polyether of formula (I) in which p equals 0, $R^1$ is the methyl radical, $R^3$ is the n-propylene radical, R⁴ is an alkylene radical having 3 carbon atoms. This polyether has a viscosity (measured at 23° C.) of 30 Pa·s, an $M_n$ of 32 240 Da and a polydispersity index of 1.3.

DESMOSEAL® S XP 2636, available from Bayer, is a polyether of formula (I) in which p equals 0, R¹ is the methyl radical, R³ is the n-propylene radical, R⁴ is an alkylene radical having 3 carbon atoms. This polyether has a viscosity (measured at 23° C.) of 35 Pa·s, an $M_n$ of 33 408 Da and a polydispersity index of 1.9.

Example 1 is repeated with the compositions indicated in the table, in which the results obtained for the tests are also given.

EXAMPLES 4 AND 5

Heat-Curable Adhesive Composition Based on DESMOSEAL® S XP 2636 Alkoxysilane-Terminated Polyether Example 3 is repeated with the tackifying resins (B) indicated in the table, which also gives the results obtained for the tests.

EXAMPLE A

Comparative: Heat-curable Adhesive Composition Corresponding to Example 2 from WO 09/106,699

Example 1 is repeated, replacing the alkoxysilane-terminated polyether with the alkoxysilane-terminated polyurethane A illustrated in international application WO 09/106,699, in order to obtain the composition indicated in the table. This composition is almost identical to that of Example 2 from WO 09/106,699.

The results obtained for the tests are also given in the table.

The adhesive compositions from Examples 1 to 5 make it possible to obtain, for a heat-curing time of 30 s, a self-adhesive support which has good tack and adhesive strength properties. The latter furthermore offers excellent behaviour at 95° C., unlike that obtained, under the same conditions, with the adhesive composition from Example A.

|  | Resistance time of the adhesive joint to static shear at 95° C. | >24 hours | >24 hours | >24 hours | >24 hours | >24 hours | 1 minute |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding FR application No. 09.06194, filed Dec. 21, 2009, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A heat-curable adhesive composition comprising:
from 20 to 85% of a polyether (A) comprising 2 hydrolysable alkoxysilane-type end groups, having a viscosity, measured at 23° C., ranging from 25 to 40 Pa·s and of formula (I):

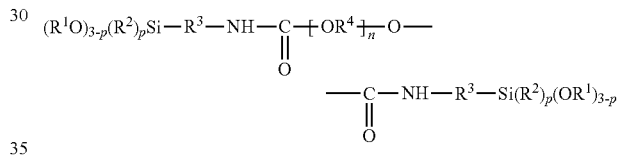

in which:
R¹ and R², which are identical or different, each represent a linear or branched alkyl radical having 1 to 4 carbon atoms, with the possibility, when there are several R¹ (or R²) radicals, that these are identical or different;
R³ represents a linear alkylene divalent radical comprising from 1 to 6 carbon atoms;
R⁴ represents a linear or branched alkylene divalent radical comprising from 1 to 4 carbon atoms;

|  | Content in % |  |  |  |  |  |
|---|---|---|---|---|---|---|
| Ingredient | Example 1 | Example 2 | Example 3 | Example 4 | Example 5 | Example A (comparative) |
| (A) GENIOSIL® STP-E30 | 53.7 | — | — | — | — | — |
| GENIOSIL® STP-E35 | — | 53.7 | — | — | — | — |
| DESMOSEAL® S XP 2636 | — | — | 53.7 | 51 | 51 | — |
| Polyurethane A illustrated in WO 09/106699 | — | — | — | — | — | 53.7 |
| (B) DERTOPHENE® H150 | 44.7 | 44.7 | 44.7 | — | — | 44.7 |
| SYLVALITE® RE 100 | — | — | — | 47 | — | — |
| NORSOLENE® W100 | — | — | — | — | 47 | — |
| (C) K-KAT® 5218 | 1.6 | 1.6 | 1.6 | 2 | 2 | 1.6 |
| Thermosel viscosity at 100° C. (Pa·s) | 20 | 15.5 | 23 | 25 | 15 | 20 |
| 180° Peel (N/cm) | 8.3 | 8 | 7 | 12 | 4.8 | 9 |
| Tack (N/cm²) | 6.7 | 5.3 | 6.3 | 3.5 | 3.2 | 5 | n is an integer such that the number-average molecular weight $M_n$ of the polymer of formula (I) is between 20 kDa and 40 kDa;

p is an integer equal to 0, 1 or 2;

from 15 to 80% of a compatible tackifying resin (B), having a number-average molecular weight between 200 Da and 10 kDa; and from 0.01 to 3% of a curing catalyst (C).

2. The adhesive composition according to claim 1, wherein the polyether (A) of formula (I) has one and/or the other of the following features:

$R^1$ and $R^2$, which are identical or different, each represent a methyl or ethyl radical;

$R^3$ represents a linear alkylene divalent radical comprising from 1 to 3 carbon atoms;

$R^4$ is chosen from the divalent radicals: ethylene, isopropylene, n-propylene, n-butylene, ethyl-ethylene.

3. The adhesive Adhesive composition according to claim 1, wherein the polyether (A) of formula (I) is such that:

p=0 or 1;

$R^1$ and $R^2$ each represent the methyl radical; and $R^4$ is an alkylene radical having 3 carbon atoms.

4. The adhesive composition according to claim 1, wherein the polyether (A) of formula (I) is such that its number-average molecular weight varies from 30 to 40 kDa and its viscosity from 30 to 37 Pa·s.

5. The adhesive composition according to claim 1, wherein the polyether (A) of formula (I) has a polydispersity index ranging from 1 to 2.

6. The adhesive composition according to claim 1, wherein the resin (B) is:

(i) a resin obtained by polymerization of terpene hydrocarbons and phenols, in the presence of Friedel-Crafts catalysts;

(ii) a resin obtained by a process comprising the polymerization of α-methylstyrene;

(iii) a natural or modified rosin, optionally hydrogenated, dimerized, polymerized or esterified by monoalcohols or polyols;

(iv) a resin obtained by hydrogenation, polymerization or copolymerization of mixtures of unsaturated aliphatic hydrocarbons having around 5, 9 or 10 carbon atoms derived from petroleum fractions;

(v) a terpene resin;

(vi) a copolymer based on natural terpenes; or (vii) an acrylic resin having a viscosity at 100° C. of less than 100 Pa·s.

7. The adhesive composition according to claim 6, wherein the resin (B) is a resin of type (i) or (ii).

8. The adhesive composition according to claim 6, wherein the resin (B) is a resin of type (iii).

9. The adhesive composition according to claim 1, comprising from 40 to 65% of polyether (A) of formula (I) and from 35 to 60% of tackifying resin(s) (B).

10. The adhesive composition according to claim 1, comprising up to 3% of a hydrolysable alkoxysilane derivative, as a desiccant.

11. A self-adhesive support capable of being obtained by a process comprising:

(a) preheating the adhesive composition as defined in claim 1 to a temperature between 50 and 130° C.; then (b) coating it onto a support layer; then (c) curing it, by heating the thus coated support at a temperature between 50 and 150° C.

12. Single-sided or double-sided self-adhesive labels and/or tapes comprising the self-adhesive support as defined in claim 11.

* * * * *

UNITED STATES PATENT AND TRADEMARK OFFICE
CERTIFICATE OF CORRECTION

PATENT NO. : 8,691,909 B2
APPLICATION NO. : 12/973044
DATED : April 8, 2014
INVENTOR(S) : La Ferte et al.

Page 1 of 1

It is certified that error appears in the above-identified patent and that said Letters Patent is hereby corrected as shown below:

In the Claims

Column 11, line 18 reads "3. The adhesive Adhesive composition according to claim" should read -- 3. The adhesive composition according to claim --

Column 12, line 3 reads "(iii) a natural or modified rosin optionally hydrogenated," should read -- (iii) a natural or modified resin optionally hydrogenated, --

Signed and Sealed this
Fifteenth Day of July, 2014

Michelle K. Lee
*Deputy Director of the United States Patent and Trademark Office*